US007903892B2

(12) United States Patent
Oldcorn et al.

(10) Patent No.: US 7,903,892 B2
(45) Date of Patent: Mar. 8, 2011

(54) IMAGE ANALYSIS FOR IMAGE COMPRESSION SUITABILITY AND REAL-TIME SELECTION

(75) Inventors: David Oldcorn, Newcastle (GB); Andrew Pomianowski, Harpenden (GB); Raja Koduri, Santa Clara, CA (US)

(73) Assignee: ATI Technologies ULC, Markham, Ontario (CA)

( * ) Notice: Subject to any disclaimer, the term of this patent is extended or adjusted under 35 U.S.C. 154(b) by 341 days.

(21) Appl. No.: 10/282,799

(22) Filed: Oct. 29, 2002

(65) Prior Publication Data

US 2004/0081357 A1    Apr. 29, 2004

(51) Int. Cl.
*G06K 9/36* (2006.01)
*G06K 9/46* (2006.01)

(52) U.S. Cl. .......................................................... 382/239
(58) Field of Classification Search .................... 382/232
See application file for complete search history.

(56) References Cited

U.S. PATENT DOCUMENTS

| | | | |
|---|---|---|---|
| 4,580,134 A | | 4/1986 | Campbell et al. |
| 4,821,208 A | | 4/1989 | Ryan et al. |
| 4,887,151 A | | 12/1989 | Wataya |
| 4,974,071 A | | 11/1990 | Maeda |
| 5,045,852 A | * | 9/1991 | Mitchell et al. .............. 341/51 |
| 5,046,119 A | | 9/1991 | Hoffert |
| 5,047,853 A | | 9/1991 | Hoffert et al. |
| 5,218,431 A | * | 6/1993 | Gleicher et al. .............. 348/472 |
| 5,287,200 A | * | 2/1994 | Sullivan et al. .............. 382/251 |
| 5,430,464 A | | 7/1995 | Lumelsky |
| 5,452,017 A | | 9/1995 | Hickman |
| 5,463,700 A | * | 10/1995 | Nakazawa .................... 382/232 |
| 5,544,286 A | | 8/1996 | Laney |
| 5,552,832 A | * | 9/1996 | Astle .......................... 375/240.24 |
| 5,576,845 A | | 11/1996 | Komatsu |
| 5,585,944 A | | 12/1996 | Rodriguez |
| 5,600,373 A | | 2/1997 | Chui et al. |

(Continued)

FOREIGN PATENT DOCUMENTS

JP    5216993    8/1993

(Continued)

OTHER PUBLICATIONS

European Patent Office, International Search Report issued Jul. 14, 2006 for Application No. PCT/IB2006/000700.
Hui, L.; An adaptive block truncation coding algorithm for image compression; ICASSP 90; 1990 International Conference on Acoustics, Speech and Signal Processing; Apr. 3, 1990; pp. 2233-2236.

(Continued)

*Primary Examiner* — Yuzhen Ge
(74) *Attorney, Agent, or Firm* — Vedder Price P.C.

(57) ABSTRACT

The present invention provides an analysis method that uses error metrics to determine whether an image is suitable for compression. One embodiment of the present invention can make the determination in real-time. In one embodiment, analysis methods based on four error metrics are used to determine whether a compressed image should be used. The first metric is a signal-to-noise (SNR) error metric that prevents compressed images with low SNR from being used to represent original images. Another metric is detecting the geometric correlation of pixels within individual blocks of the compressed images. The third metric is used to determine whether color mapping in the compressed images are well-mapped. A final metric is a size metric that filters images smaller than a certain size and prevents them from being compressed. As most analysis methods are integral parts of the compression process, the present invention incurs little cost collecting error metric data.

19 Claims, 10 Drawing Sheets

U.S. PATENT DOCUMENTS

| | | | |
|---|---|---|---|
| 5,619,591 | A | 4/1997 | Tsang et al. |
| 5,682,152 | A | 10/1997 | Wang et al. |
| 5,682,249 | A | 10/1997 | Harrington et al. |
| 5,734,744 | A | 3/1998 | Wittenstein et al. |
| 5,742,892 | A | 4/1998 | Chadda |
| 5,748,174 | A | 5/1998 | Wong et al. |
| 5,748,904 | A | 5/1998 | Huang et al. |
| 5,787,192 | A | 7/1998 | Takaichi et al. |
| 5,805,226 | A | 9/1998 | Jung |
| 5,822,460 | A | 10/1998 | Kim |
| 5,822,465 | A | 10/1998 | Normile et al. |
| 5,847,762 | A | 12/1998 | Canfield et al. |
| 5,877,819 | A * | 3/1999 | Branson ............... 348/701 |
| 5,903,673 | A * | 5/1999 | Wang et al. ............ 382/236 |
| 5,929,862 | A | 7/1999 | Barkans |
| 5,956,425 | A | 9/1999 | Yoshida |
| 5,956,431 | A * | 9/1999 | Iourcha et al. ......... 382/253 |
| 5,959,631 | A | 9/1999 | Knittel |
| 5,978,511 | A * | 11/1999 | Horiuchi et al. ....... 382/241 |
| 5,987,175 | A | 11/1999 | Imaizumi et al. |
| 5,995,122 | A | 11/1999 | Hsieh et al. |
| 6,005,971 | A | 12/1999 | Bergman et al. |
| 6,009,200 | A * | 12/1999 | Fujita et al. ............ 382/232 |
| 6,031,939 | A * | 2/2000 | Gilbert et al. .......... 382/239 |
| 6,049,630 | A | 4/2000 | Wang et al. |
| 6,052,203 | A * | 4/2000 | Suzuki et al. ........... 358/1.9 |
| 6,075,619 | A | 6/2000 | Iizuka |
| 6,111,607 | A | 8/2000 | Kameyama |
| 6,125,201 | A * | 9/2000 | Zador .................... 382/166 |
| 6,128,000 | A | 10/2000 | Jouppi et al. |
| 6,188,394 | B1 | 2/2001 | Morein et al. |
| 6,192,155 | B1 | 2/2001 | Fan |
| 6,195,024 | B1 * | 2/2001 | Fallon ...................... 341/51 |
| 6,285,711 | B1 * | 9/2001 | Ratakonda et al. ...... 375/240.16 |
| 6,309,424 | B1 * | 10/2001 | Fallon ...................... 341/51 |
| 6,320,981 | B1 | 11/2001 | Yada |
| 6,349,151 | B1 * | 2/2002 | Jones et al. ............ 382/251 |
| 6,438,165 | B2 | 8/2002 | Normile |
| 6,529,631 | B1 * | 3/2003 | Peterson et al. ........ 382/232 |
| 6,606,417 | B1 | 8/2003 | Brechner |
| 6,614,449 | B1 | 9/2003 | Morein |
| 6,658,146 | B1 | 12/2003 | Iourcha et al. |
| 6,683,978 | B1 | 1/2004 | Iourcha et al. |
| 6,683,979 | B1 | 1/2004 | Walker |
| 6,687,410 | B1 * | 2/2004 | Brown .................... 382/239 |
| 6,731,810 | B1 | 5/2004 | Miura et al. |
| 6,825,847 | B1 | 11/2004 | Molnar et al. |
| 6,944,332 | B1 | 9/2005 | Brechner |
| 6,990,249 | B2 | 1/2006 | Nomura |
| 7,050,641 | B1 | 5/2006 | Kharitonenko |
| 7,103,357 | B2 | 9/2006 | Kirani et al. |
| 7,158,271 | B2 | 1/2007 | Sawada |
| 7,177,371 | B1 * | 2/2007 | Hudson et al. ......... 375/308 |
| 7,224,846 | B2 | 5/2007 | Fujishiro et al. |
| 7,352,300 | B2 * | 4/2008 | Fallon ...................... 341/51 |
| 7,355,603 | B2 | 4/2008 | Donovan et al. |
| 7,505,624 | B2 | 3/2009 | Ogden et al. |
| 2004/0161146 | A1 | 8/2004 | Van Hook et al. |
| 2004/0174379 | A1 | 9/2004 | Collodi |
| 2004/0228527 | A1 | 11/2004 | Pomianowski et al. |
| 2006/0188163 | A1 | 8/2006 | Elder |
| 2006/0215914 | A1 | 9/2006 | Ogden et al. |
| 2009/0274366 | A1 | 11/2009 | Iourcha et al. |

FOREIGN PATENT DOCUMENTS

| | | |
|---|---|---|
| WO | WO 97/08900 | 3/1997 |
| WO | WO 99/18537 | 4/1999 |

OTHER PUBLICATIONS

Goeddel, T.W. et al.; A Two-Dimensional Quantizer for Coding of Digital Imagery; IEEE Transactions on Communications USA; vol. COM-29, No. 1; Jan. 1981; pp. 60-67.

Franti, P. et al.; Compression of Digital Images by Block Truncation Coding: A Survey; Computer Journal; Oxford University Press, Surrey, GB; vol. 37, No. 4; Jan. 1994.

Deering, et al.; Leo: A System for Cost Effective 3D Shaded Graphics; Proceedings of the 20th Annual Conference on Computer Graphics and Interactive Techniques; 1993; pp. 101-108.

Akeley; RealityEngine Graphics; Proceedings of the 20th Annual Conference on Computer Graphics and Interactive Techniques; 1993; pp. 109-116.

Belur V. Dasarathy; Image Data Compression—Block Truncation Coding; IEEE; pp. 55-121; Los Alamitos, California.

Andreas Schilling, Wolfgang Strasser, Gunter Knittel; Texram: A Smart Memory for Texturing; May 1996; IEEE Computer Graphics and Applications.

Graham Campbell; Two Bit/Pixel Full Color Encoding; 1984; vol. 20, No. 4; Dallas.

Ching-Yung Yang, Ja-Chen Lin; Hybrid Adaptive Block Truncation Coding for Image Compression; Apr. 1997; Society of Photo-Optical Instrumentation Engineers; Taiwan.

Anders Kugler; High-Performance Texture Decompression Hardware; 1997; The Visual Computer.

Panos Nasiopoulos, Rabab K. Ward and Daryl J. Morse; Adaptive Compression Coding; Aug. 1991; IEEE Transactions on Communications, New York, U.S.

G. Knittel, A Schilling, A. Kugler and W. Strasser; Hardware for Superior Texture Performance.

Edward J. Delp and Robert O. Mitchell; Image Compression Using Block Truncation Coding; 1979; IEEE.

C. Y. Yang and J. C. Lin; Use of Radius Weighted Mean to Cluster Two-Class Data; May, 1994; vol. 30, No. 10; Electronics Letters.

John C. Russ; Optimal Grey Scale Images from Multiplane Color Images; 1995; vol. 7, No. 4; Journal of Computer-Assisted Microscopy.

Yushu Feng and Nasser M. Nasrabadi; A Dynamic Address Vector Quantization Algorithm Based on Inter-Block and Inter-Color Correlation for Color Image Coding; 1989; IEEE.

K. T. Lo and W. K. Cham; New Predictive Classified Vector Quantization Scheme for Image Compression; Aug. 1994; vol. 30, No. 16; Electronics Letters.

Kowk-Tung Lo and Wal-Kuen Cham; New Classified Vector Quantization of Images; 1993; IEEE, Beijing.

Edward J. Delp and Owen Robert Mitchell; Moment Preserving Quantization; 1991; IEEE.

Bing Zeng and Yrjo Neuvo; Interpolative BTC Image Coding with Vector Quantization; 1993; IEEE.

Maximo D. Lema and O. Robert Mitchell; Absolute Moment Block Truncation and Its Application to Color Images;1984; IEEE.

Yiyan Wu and David C. Coll; Single Bit-Map Block Truncation Coding of Color Images; 1992; IEEE.

Mohammed Kamel, C. T. Sun and Lian Guan; Image Compression by Variable Block Truncation Coding with Optimal Threshold; 1991; IEEE.

B. Zeng; Two Interpolative BTC Image Coding Schemes; Jun. 1991; Electronics Letters.

Y. A. Alsaka and D. A. Lee; Three Level Block Truncation Coding; 1990; IEEE.

E. Walach; A Modified Block Truncation Coding Technique for Image Compression; 1983; IEEE.

Bernd Lamparter and Wolfgang Effelsberg; eXtended Color Cell Compression—A Runtime-efficient Compression Scheme for Software Video.

Takio Kurita and Nobuyuki Otsu; A Method of Block Truncation Coding for Color Image Compression; 1993; IEEE.

Soo-Chang Pei and Ching-Min Cheng; A Novel Block Truncation Coding of Color Images Using a Quaternion-Moment-Preserving Principle; 1997, IEEE.

Tak Po Chan; Bing Zeng and Ming L. Liou; Visual Pattern BTC with Two Principle Colors for Color Images; 1995; IEEE.

Quoping Qiu; Color Image Coding and Indexing Using BTC; 1994; IEEE.

K. W. Chan and K. L. Chan; Optimized Adaptive AMBTC; 1994; IEEE.

Eric Dubois; Effects of Digital Demodulation on Component Coding of NTSC Color Signals; 1979; IEEE.

* cited by examiner

IM12

IM22

IM11

IM21

ZM12

ZM22

ZM11

ZM21

$$S = \begin{pmatrix} 15 & 14 & 13 & 12 \\ 13 & 12.5 & 11.5 & 11 \\ 12 & 11.5 & 10.5 & 10 \\ 11 & 10 & 9 & 8 \end{pmatrix}$$

IMAGE ANALYSIS FOR IMAGE COMPRESSION SUITABILITY AND REAL-TIME SELECTION

BACKGROUND OF THE INVENTION

1. Field of the Invention

This invention relates in general to methods of analyzing images to determine in real-time whether an image can be compressed without causing visible anomalies. More specifically, but without restriction to the particular embodiments hereinafter described in accordance with the best mode of practice, this invention relates to methods and software for assessing in the suitability of images for compression.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all rights whatsoever. ATI, and all ATI-based trademarks and logos are trademarks or registered trademarks of ATI, Inc. in the United States and other countries.

2. Background Art

The display of the computer system is thought of as a "frame" in which an image is presented. An image in the frame is decomposed into discrete elements which are termed pixels (picture elements). Pixels are the tiny dots of color on a computer display screen that collectively make up a computer display image. There are a number of color models that are employed to represent the pixels' individual colors. The purpose of a color model is to allow a convenient specification of colors within some color gamut. Typically, each pixel's display color is represented by three color components: red, green, and blue. This particular color model is often called the Red Green Blue (RGB) Color Model. The RGB model employs a unit cube subset of the 3D Cartesian coordinate system to map out the primary colors, with R, G, and B axes and with black (no light) at its origin. Thus, since the model is a unit cube, the axes each have an intensity range between 0 and 1. The primary characteristics are additive meaning that individual contributions of each primary color are added together to yield the resultant pixel color. Each pixel's own individual color characteristics are represented by a specific binary number. Thus, it follows that computer display images are typically represented as a two-dimensional matrix of digital data values.

The process of digitizing images ordinarily generates large amounts of image data. Depending upon the number of pixels in a frame, storing and/or transmitting uncompressed image data will usually require a large amount of computer memory. For this reason, whenever possible, it is advantageous to compress the original image data. Compression of image data improves the performance of video accelerators and reduces the amount of used memory. However, depending upon the particular image being compressed and the type of compression method being applied, compression can degrade the image's visual quality by varying amounts.

There have been various techniques developed in the past to determine whether or not a specific compressed image will be acceptable to use instead of its corresponding original image. However, these past techniques are indiscriminate, which usually causes the unfavorable result of visual artifacts, and/or labor-intensive, which eliminates the ability of real-time use. Most of the existing methods for determining whether a compressed image will appear unflawed to the eye are purely numerical based schemes, and do not take the visual characteristics of the eye into account.

A common numerical-based technique used to determine this is simply the calculation of the average error of the compressed image in absolute magnitude compared to the original non-compressed image. For all of the individual elements of the picture, the average error is the summation of the differences between those elements of the compressed image and all of the elements of the original non-compressed image. This method only accumulates the average overall error of the compressed image. The problem with this method is that it will at times discard acceptable compressed images. This is because there are many compressed images where the average overall error is extremely high, but the images themselves visually appear to the eye to be identical to the original non-compressed image. The reason for this is that, although the actual error is high, in places on the image where there is a great deal of high frequency noise, the eye filters out these visual effects. Thus, only if the compressed image and original image were placed side-by-side, would the eye possibly be able to detect a slight difference. But, at a casual glance, it will not be possible for the eye to be able to distinguish between the two images.

Another existing technique to determine when to compress images is the use of human-intervention to detect image textures that do or do not compress well. This technique is very labor-intensive and, hence, is not suitable for real-time use.

Also, it should be noted that a common method of image compression itself simply consists of applying a single compression method to all images. This method does not perform any analysis of how the images will visually appear after compression has been performed. These types of compression techniques, which do not evaluate the suitability of the compressed image at all, will invariably produce visual artifacts.

A common compression algorithm currently used is the DirectX Texture Compression (DXTC) method. This method codes new pixels from the original image pixels which are grouped into 4×4 pixel blocks. Each new pixel in the block is encoded into two bits. The new pixel's bits represent colors chosen so that they best reproduce the corresponding original pixel's colors. These colors are chosen by the following process. First, two of the original pixels are chosen as the "endpoint colors", which define a line in the RGB color space. This line is termed the "compression axis". Then, the remaining pixels in the block are encoded into color values that lie along the line that represent the closest value which lies along the line to the original pixel color. Mathematically, this is accomplished by projecting the original pixel color onto the compression axis. Finally, all of the color values which lie on the compression axis are encoded into two bits, representing four ranges on the compression axis. Hence, each pixel within the 4×4 pixel block is encoded into two bits representing one of these four values.

The DXTC method may not work well for all images. This method does not apply any test to ensure accurate visual representation of the original image. It is only a compression algorithm. If the original colors do not map well, visual artifacts may result.

SUMMARY OF THE INVENTION

The present invention provides an analysis method to produce a series of measurements which determines whether an image is suitable for compression. These measurements are known as error metrics and relate directly to the likelihood of visible artifacts being produced after compression of the image. These error metrics are analyzed to produce a decision on whether or not the image texture is acceptable for compression. In one embodiment, the implementation of the method of the present invention can make the determination in real-time.

In one embodiment, analysis methods based on four error metrics are used to determine whether a compressed image should be used. The first metric is a signal-to-noise (SNR) error metric that prevents compressed images with low SNR from being used to represent original images. Another metric is detecting the geometric correlation of pixels within individual blocks of the compressed images. The third metric is used to determine whether color mapping in the compressed images are well-mapped. A final metric is a size metric that filters images smaller than a certain size and prevents them from being compressed. These analysis methods are used in combination to determine whether a compressed image should be kept. Most of the analysis methods are actually integral parts of the compression process. Therefore, the present invention incurs very little extra time cost to collect error metric data during compression. Also since compression itself is an operation that takes significant time, data collection is a shorter operation. Furthermore the processing cost is also low since the compression process gives the data needed to perform the error metric analysis.

BRIEF DESCRIPTION OF THE DRAWING

Further objects of the present invention together with additional features contributing thereto and advantages accruing therefrom will be apparent from the following description of the preferred embodiments of the invention which are shown in the accompanying drawing figures with like reference numerals indicating like components throughout, wherein.

DETAILED DESCRIPTION OF THE INVENTION

The present invention provides an analysis method to produce a series of measurements that determines whether an image is suitable for compression. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Determining whether compressed images are acceptable has long been a problem in the art and various methods have been attempted to analyze acceptability. Embodiments of the present invention are aimed at using a series of measurements to determine whether an image is suitable for compression. These measurements are known as error metrics and relate directly to the likelihood of visible artifacts being produced after compression of the image.

Approach Overview

Figure 1:
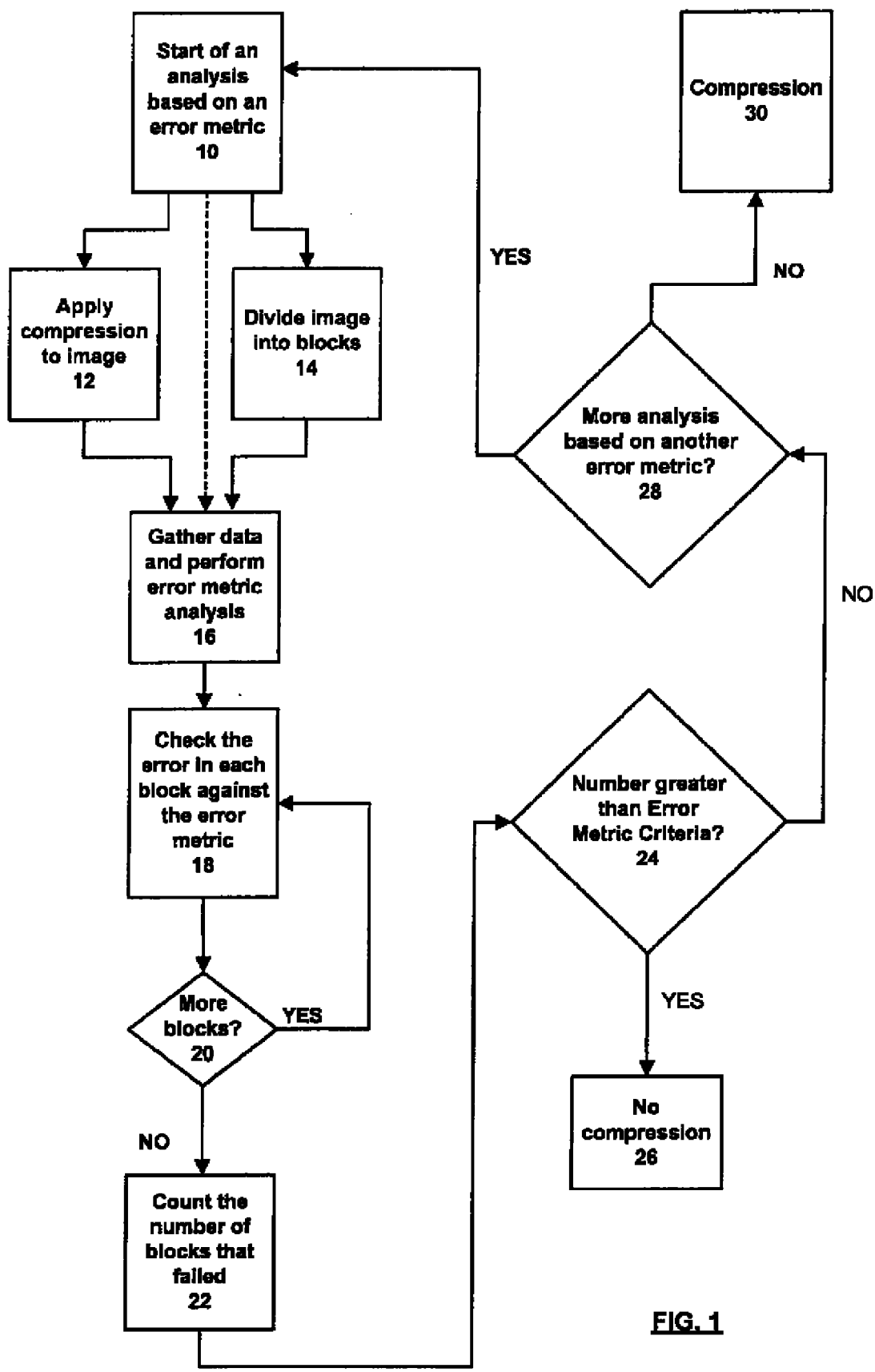
FIG. 1 is a flow chart that illustrates the steps involved in the analysis method of the present invention.

Typically given any input image, several analyses will be performed in accordance to the present invention. FIG. 1 is a flow chart that illustrates the steps involved in the analysis. Since each analysis step is based on an error metric, the first step is to begin a particular analysis based on an error metric (step 10). There are two paths that the method can take in this first iteration. The dotted line only applies when the method has already performed a first analysis (see step 28). In step 12, the input image is compressed. As part of the compression process, the image is divided into blocks. Some error metrics take advantage of the compression process and gather data from the compression process in step 16. In one embodiment of the present invention, the geometric correlation and axis mapping error metrics gather relevant by-product data of the compression process. Since the data is generated as the by-product of the compression process, there is little extra effort needed for gathering. However, some error metrics do not need compression to be first performed. In these cases, the process proceeds to step 14, where the method simply divides the image up into blocks. In one embodiment of the present invention, the signal-to-noise ratio (SNR) and image size metrics do not require compression first.

In either case, in step 16, the method gathers data, and performs the necessary calculations for the error metric analysis. In step 18, the analysis continues by checking the errors within all blocks against the error metric. The determining step of step 20 ensures that the method continues until all blocks are checked. In step 22, the method counts the number of blocks that failed the error metric. In step 26, the method rejects compression if the certain number of blocks that failed is greater than the error criteria in step 24. An alternate check is to see if the summed values from the blocks fail the error criteria in step 24. If not, the method moves to step 28, where it checks for whether additional analysis is to be performed. If so, the method begins again in steps 10. Otherwise compression is accepted (step 30). If the image has been compressed already, the compressed version is used. Notice that the second time around the method may skip one of steps 12 and 14 because it has been performed already. The method may proceed to step 16 directly, as indicated by the dotted line.

Overall, the error metrics are analyzed to produce a decision on whether or not the image texture is acceptable for compression. The implementation of the method of the present invention can make the determination in real-time. In one embodiment, the error metrics of the present invention is geared toward checking images that are compressed by the DXTC method. It should be understood that the error metrics can be applied to a number of other compression algorithms also. The description below details the application of each error metric analysis.

Frequency-space Analysis (Signal to Noise Ratio)

This analysis method is designed to detect whether the signal-to-noise-ratio (SNR) of the compressed image is too low to sufficiently represent a source image. If the SNR of a source image is fundamentally high, then the lower SNR of a compressed image may not be able to represent the source sufficiently accurately (i.e. poor quality is visually detectable).

To see how this error metric affects visible image quality, consider this example analogy. A photograph (source image) is converted to a black and white image representation. If one were to look at the image representation in low resolution, it would look terrible. It would not look much like the source image unless the source image also happened to be black and white. This degradation in quality is caused by the introduction of noise. Noise is introduced because the conversion tried to represent a source image that is not representable in a binary state (i.e. bit depth=1).

The idea of non-representability can be illustrated by starting at the photograph level. The example photograph is an analog image, meaning that each point in the photograph can be one of an infinite number of values. To begin compression, the first step digitizes the image. Thus, individual points on the image can only take a certain set of discrete values. This introduces noise, and at that point in time the noise is called quantization noise. Then, in the process of compression one might take a group of elements (say up to 16 elements of that picture) that are spatially adjacent, all next to each other and try to represent them with only 4 levels of color, for example. This introduces another set of quantization noise.

The characteristic of the DXTC compression method is that it works on blocks that are 4×4 elements in size. Low frequency noise is introduced because there is discontinuity across these blocks. Each block is encoded with only four values; and the block next to it is encoded with four different values. Thus, there is no correlation between adjacent blocks. In other words, there is an error between the two blocks because the two blocks operate completely independently. Respectively they are sharing certain amount of the information across them.

Another fundamental characteristic of noise is the loss of bit-depth. The RGB color images that are typically fed into the processor are usually 24 bit images. However, the maximum resolution of the DXTC compressed images is approximately 19 bits. So, there is a loss of 5 bits, which reduces the SNR.

Given this understanding of noise, the first detection step is of the signal-to-noise error metric analysis primarily concerned with eliminating images that do not fit into the two categories below.

Category (1)-The source image is 24 bit and makes full use of that 24 bit color space.

Category (2)-The source image will not be accurately represented across the adjacent blocks because of low SNR.

Methods for testing for the first category are straight forward and well-known in the art. The reason behind this rejection this is simple—an image that uses the full 24-bit color space will suffer noticeable loss in quality since the DXTC method inherently reduces bit-depth. This image is not a good candidate for compression.

Figure 2:
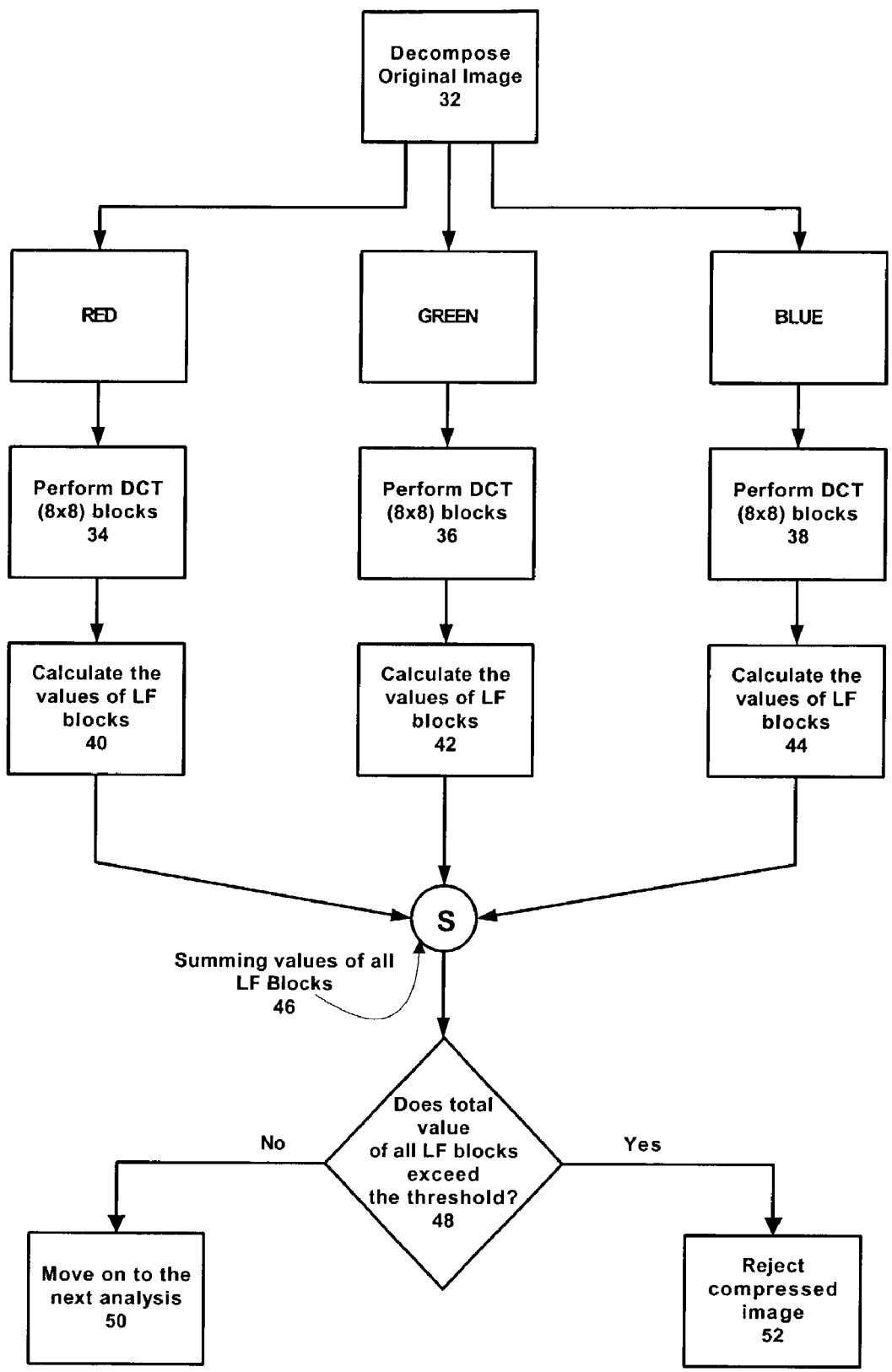
FIG. 2 is a flow char that illustrates the analysis method used in detecting the low signal to noise ratio (SNR)

FIG. 2 illustrates the method used in detecting the low SNR (second category criteria). An image is decomposed into the RGB in step 32. Then for each color component, a Discrete Cosine Transform (DCT) is performed over in 8×8 blocks over the whole image in that color component (Steps 34, 36, 38). Then the values of low frequency (LF) blocks for each color component is computed (Steps 40, 42, 44). The summing the values of all blocks from the color components is performed in step 44 to get the total number of LF blocks for the input image. In step 46, a determination is made as to whether the total value of all LF blocks exceeds the threshold. If it does, the image is rejected in step 48. If not, other analysis methods are performed on the image (if necessary, see step 28 of FIG. 1). The goal here is to make sure the low frequency values do not dominate the image. If this is the case, the compressed image is not used.

The choice of using frequency-space analysis on low frequency blocks should be noted. Those skill in the art would appreciate that various other methods can be used to determine SNR. However, what is of concerned is that SNR in low frequency blocks cause visually noticeable problems in DXTC. A high SNR in higher frequency components in the image is not particularly relevant because the characteristics of the eye tend to mask them.

Figure 3B:
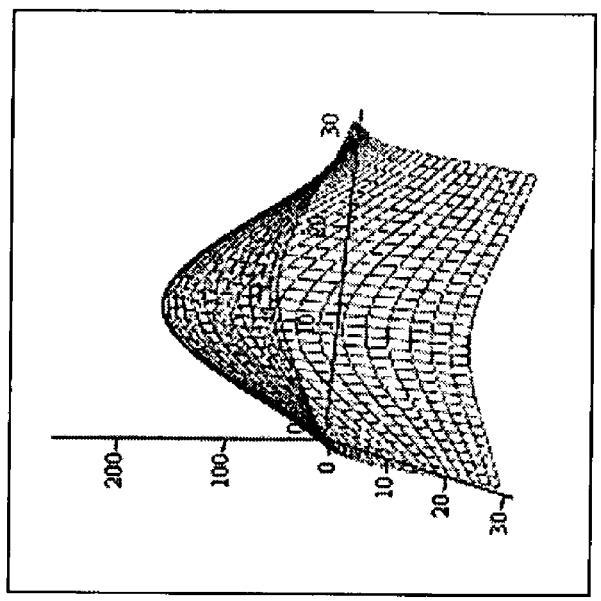
FIG. 3B is a graph that illustrates the intensity values of the Gaussian blur of FIG. 3A.
Figure 3A:
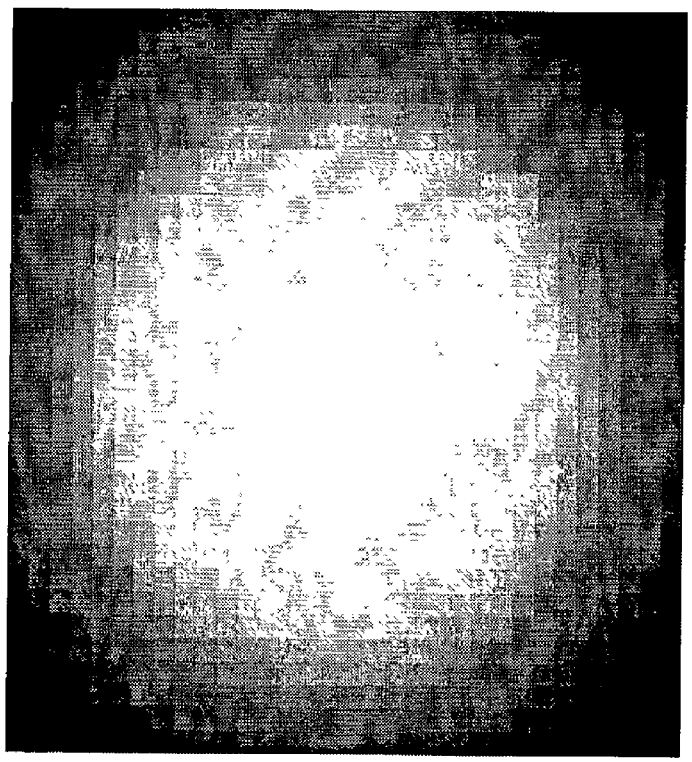
FIG. 3A is an example image that represents a Gaussian blur function to illustrate the process of Discrete Cosine Transform (DCT)

The combination of FIGS. 3A-F depict the process of performing a Discrete Cosine Transform (DCT) on 16×16 pixel blocks of an image of a Gaussian blur function. It should be noted that the Gaussian blur function is used as an example image. Also, JPEG or DXTC compression normally uses 8×8 blocks, but 16×16 blocks were chosen for this example for ease of illustration. FIG. 3A is a source image that represents a Gaussian blur function. The graph of FIG. 3B illustrates the intensity values of the Gaussian blur. The matrix M is used to represent the Gaussian blur. It has elements:

$$M_{i,j} := c e^{\frac{-[(r_i)^2 + (r_j)^2]}{2\sigma\sigma}}$$

where c and the standard deviation σ are constants and $r_i$, $r_j$ represent the pixel x, y distances from the origin.

Figure 3C:
FIG. 3C depicts the original image of FIG. 3A decomposed into four 16×16 pixel blocks in image domam.
Figure 3C:
Figure 3C:
Figure 3C:
Figure 3D:
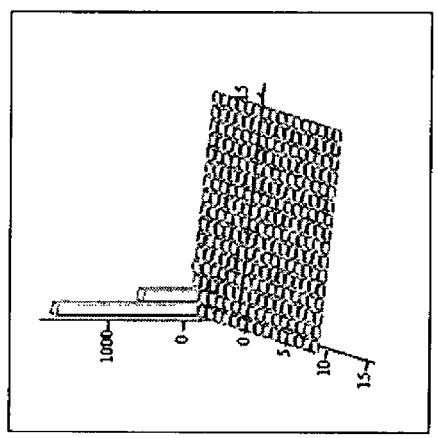
FIG. 3D illustrates the four pixel domains of FIG. 3C in spatial-frequency domain, after they have been transformed.
Figure 3D:
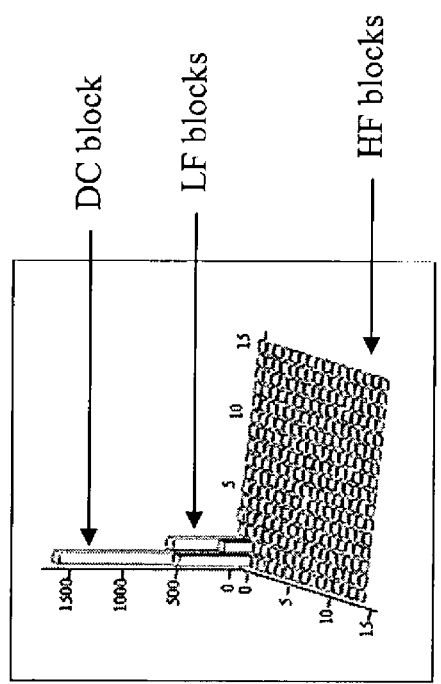
Figure 3D:
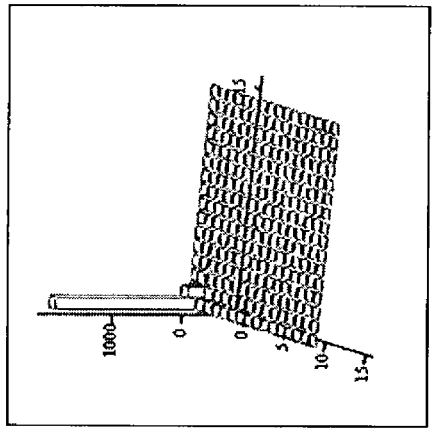
Figure 3D:
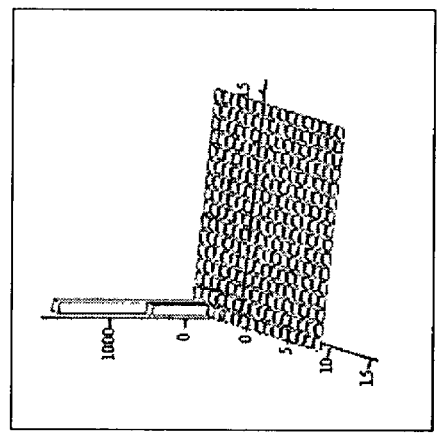

FIG. 3C depicts the original image of FIG. 3A decomposed into four 16×16 pixel blocks (IM11, IM 12, IM21 and IM22), which are in image domain. Each pixel block will undergo DCT transformation separately. FIG. 3D illustrates the four pixel blocks (ZM11, ZM12, ZM21 and ZM22), in spatial-frequency domain, after they have been transformed. The matrix, U, is used to obtain the discrete cosine transform, ZM, of an image, M, where $$ZM = U^T M U.$$

The elements of U are given by $$U_{n,1} = \frac{1}{\sqrt{N}}, \text{ and}$$

$$U_{n,m} := \sqrt{\frac{2}{N}} \cdot \cos\left[\frac{(m-1) \cdot \pi \cdot (2 \cdot n - 1)}{2 \cdot N}\right]$$

for n=1 . . . N;m=2 . . . N where the image M is an N×N array.

Note that the various components can now be identified. Note the DC components are the upper left corner element in each block. It can be seen that the values in the LF blocks can now be identified (and counted) for each 16×16 pixel block once DCT is performed. Also, note that with this error metric, the image does not have to be compressed prior to the use of frequency space analysis.

Color Space Matching (Axis Mapping)

Another analysis method is based on an error metric named color space matching or axis mapping. In generating a DXTC image, DXTC works by defining a pair of colors and then, a series of points which can only be from a direct interpolance between those two colors. This means that the points lie on a static line across the 3-D color space along the three axes, R, G, and B (see FIG. 4A). The line of the DXTC representation is referred to as the color axis, hence the name of the analysis method. If the points inside the blocks cannot be accurately mapped onto this color axis, then the block is not being accurately represented when compressed. The mapping is performed simply by calculating the distance, in 3-D color space, between (1) the point of closest approach on the axis line (the value after compression) and (2) the actual point in 3-D color space (the value before compression). If the error in mapping to the color axis is large, then the original image is not sufficiently representable by the compressed image. The metric can be trivially calculated as a byproduct of the compression process.

To illustrate this concept, consider the following example block. If all of the pixels except one in the block map well, then the entire block will be considered to map well. If none of the pixels map particularly well, then they may still be close enough. At some point there is a criteria which is currently being determined largely by experimentation. The criteria can be set in an application-by-application basis. The proper setting of the criteria enables the analysis to determine whether the mapping is acceptable.

Figure 4A:
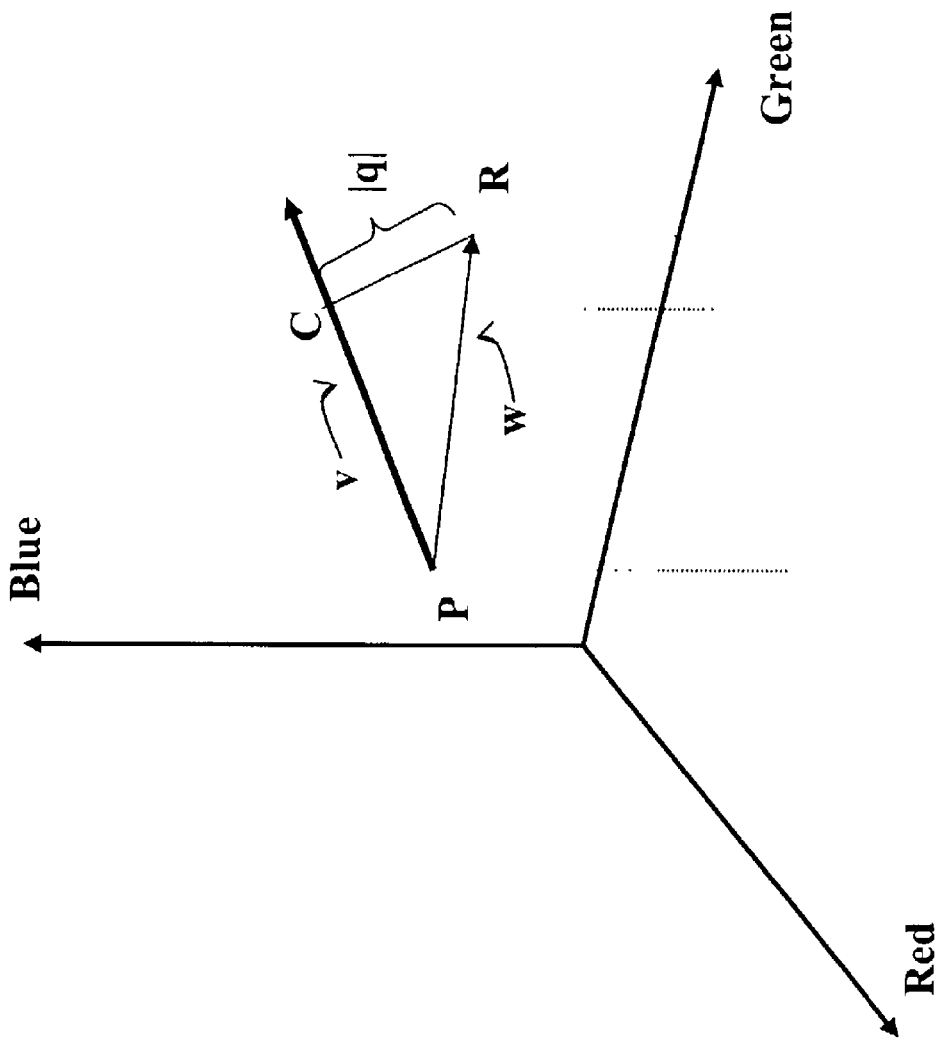
FIG. 4A is a three-dimensional diagram which depicts the DXTC encoding geometry which is used for the axis mapping error metric.

FIG. 4A is a three-dimensional diagram which depicts the DXTC encoding geometry which is used for the Axis Mapping Error Metric. The figure illustrates the DXTC encoding geometry, where an original (source) color point, R, is projected onto a point C on an one-dimensional compression axis, v. All source color points are similarly projected onto the axis. The axis is divided into four separate regions which are each denoted by a unique two-bit code. All points which lie within a region are assigned the corresponding two-bit code of that particular region. The point $C_i$ is calculated as part of the compression operation. The mathematics for calculating the point $C_i$ is shown as follows:

$$C_i = P + \frac{[(R_i - P) \cdot v] \cdot v}{v \cdot v}.$$

Figure 4B:
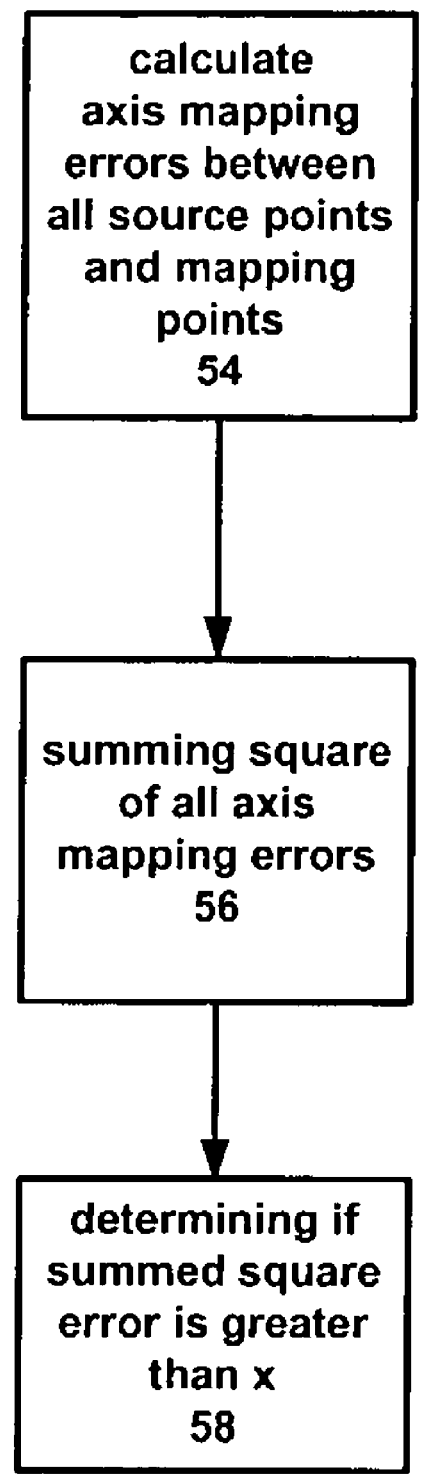
FIG. 4B presents a flow chart detailing the method of applying the axis mapping error metric analysis.

FIG. 4B is a flow chart outlining the steps of the method of application for this error metric. The first step, step 54, is to calculate all axis mapping errors. In order to evaluate the axis mapping error metric, the distance between $C_i$ and $R_i$ is first calculated. This distance is denoted by $q_i$ on the diagram. In order to calculate $q_i$, the variables $u_1$ and $w_1$ will be defined as follows:

$$u_i = C_i - P$$

$$w_i = R_i - P$$

Therefore, $u_1$ will be solved as being:

$$u_i = \frac{(w_i \cdot v)}{(v \cdot v)} \cdot v$$

Thus, it will follow that $q_1$ will equal:

$$q_i = \left[I - \frac{(v \cdot v^T)}{(v \cdot v)}\right] \cdot w_i$$

In other words, $$q_1 w_1 - u_i.$$

Note that the dot product of $v_i$ and $q_i$ equals 0 because the vectors $v_i$ and $q_i$ are perpendicular to each other. Since these vectors are perpendicular, this ensures that $C_i$ is the closest mapping point of the source (original) point $R_i$ along the compression axis.

The error metric calculation proceeds by summing the squares of the axis mapping errors (step 56), $q_i$'s, over all original points, $R_i$'s, in the block. The calculation of $q_i^2$ is shown as follows:

$$q_i^2 = w_i^2 - \frac{(w_i \cdot v)^2}{v^2}$$

The sum of the squares of the axis mapping errors equals:
Summed square error $= \Sigma q_1^2$ The use of the summation of squares was chosen for speed reasons to avoid an expensive square root operation and because it is appropriate for calculating a resultant Root Mean Square (RMS) error over the entire block. However, it should be noted that a square root operation may be used in the error metric algorithm instead of the summation of the squares method. The error metric algorithm then determines if the resulting summed square error is greater than some preset limit, x (step 58 of FIG. 5B). If the algorithm determines that the error is greater than x, the algorithm will mark that the corresponding block has a high axis mapping error. The calculation is performed as follows:

If $\alpha q_1^2 > x$, then mark the block as having a high axis mapping error.

In one embodiment x is setting that can be adjusted in an application-by-application basis. This error metric is only considered after the entire image has been through the compression process. The total number of high axis error blocks is checked as a percentage of the total blocks in the image that are not Direct Current (DC) blocks, which consist of a single color. If this percentage is found to be greater than a specified preset limit, then the image is considered to have a high axis mapping error and subsequently the compressed image is rejected.

An important point to note about this error metric is that the required data for calculation is mostly generated as a by-product of the compression. Little additional effort is needed to collect data to calculation this error metric.

Geometric Correlation

Another analysis method is based on an error metric named geometric correlation. This analysis method is directed at detecting blocks that suffer from a problem with smooth gradients that are local to a single block. This problem is a very psychovisual case and often appears when DXTC is used. Instances of this problem arise when images with smooth fade that occur over short distances are compressed. The reason behind this problem is this—what tends to happen is that the quantization, particularly between adjacent blocks, tends not be very well correlated. As such, what happens is that the image goes lumpy. What was previous the nice, smooth gradient curves go patchy or lumpy because of the adjacent blocks.

The best way to detect this problem is to look at one of the intermediate values of the compression phase. One of the intermediate values derived from the compression phase is the mapping of the distance of points from the origin along the color axis. If those tend to form a geometric correlation across the block (i.e. if they tend to rise in increasing order from one corner across to the other corner), then generally that block is representing some kind of smooth field. And, if the detection finds that there is a large number of these blocks in the image, it usually means that the image has gone lumpy.

Consider an example image broken up into 12 blocks. Then consider an imaginary circle of a gradient that fades through this image. The circle would intersect each block at different points. Since each point will pick different quantization, the end result is that there is a clear join where each block meets its neighbor, because of the different values. If there is just a diagonal line going through the blocks, then there would be a different number of pixels of each color in each block. So, each block would tend to pick a different quantization.

Figure 5A:
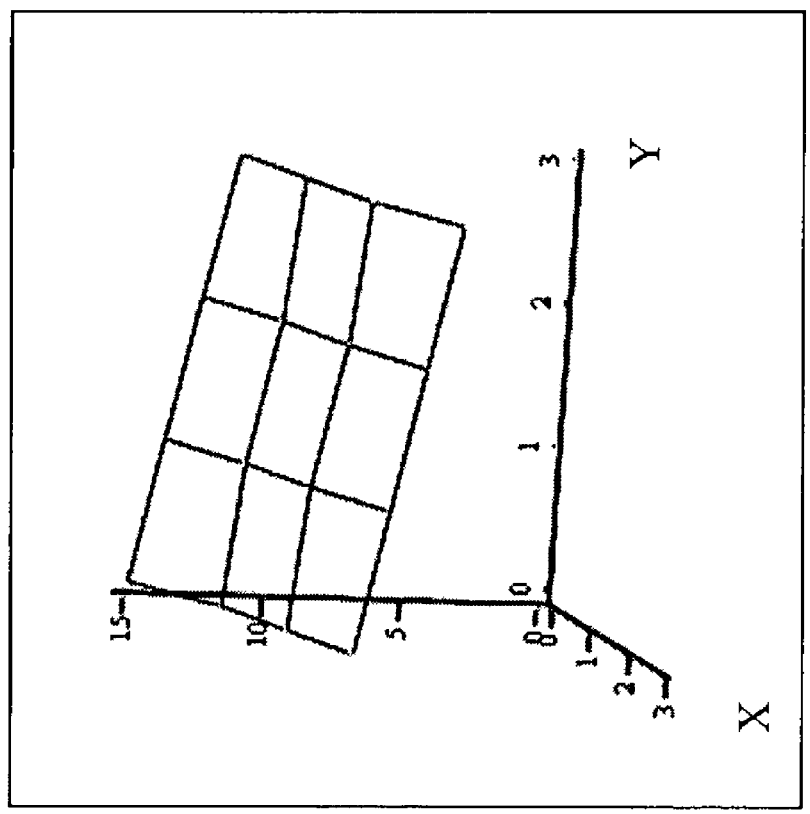
FIG. 5A is a three-dimensional diagram that depicts a surface plot of a block's pixel values which exhibits a gradual, monotonic slope that indicates the likelihood of image visual defects.
Figure 5B:
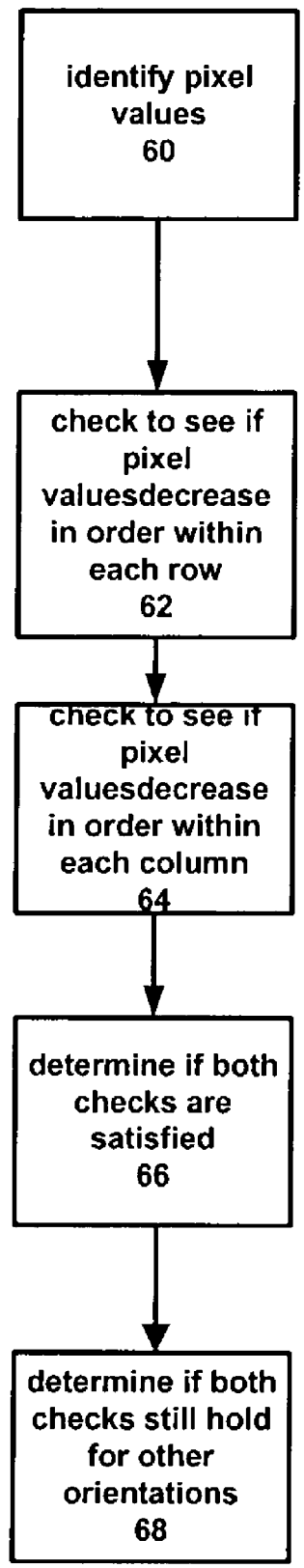
FIG. 5B presents a flow chart detailing the method of applying the geometric correlation error metric analysis.

FIG. 5A is a three-dimensional diagram that depicts a surface plot of a 4×4 block's pixel values that exhibits a gradual, monotonic slope that indicates the likelihood of image visual defects. The bottom two axes X and Y map out the pixels within the pixel block S. FIG. 5A illustrates an example of pixels within a block that are highly correlated. The values of the 4×4 block are shown in the matrix S. In the diagram, since the pixels are highly correlated, the surface plot of their values, S, appears as a gradual, monotonic slope.

The "Geometric Correlation along the Axis Error Metric" algorithm operates by identifying whether each of the DXTC 4×4 pixel blocks has a strong geometric correlation. Blocks in which there is a strong correlation of the mapped axis positions are frequently poorly represented by a DXTC compressed image. This is usually because adjacent blocks are individually compressed under the DXTC compression method and do not affect each other at all under current compression methods. This independent compressing of the blocks leads to different "endpoint colors" which may result in a semi-random visual perturbation of the resultant image, depending upon whether the blocks are correlated. If the source image contains a strong geometric pattern, this semi-random perturbation will disrupt the pattern. Since the eye is largely a pattern-recognition machine, the disruption of the pattern is clearly visible.

This error metric detects blocks that contain geometric patterns. To detect blocks that contain these patterns, the axis distances for each original pixel color are checked for geometric correlation across the block FIG. 5B describes the process and an example is given to illustrate the steps process. First, in step 60, the method identifies all pixel values within the block. This square represents the possible locations within the 4×4 block

| A | B | C | D |
| E | F | G | H |
| I | J | K | L |
| M | N | O | P |

Then in steps 62 and 64, two checks are performed to ensure that the pixel values decrease in monotone fashion within each row (step 62) and within each column (step 64). In other words, the block is geometrically correlated if all the below tests are true:

$A > B > C > D$ $E > F > G > H$ $I > J > K > L$ $M > N > O > P$ $A > E > I > M$ $B > F > J > N$ $C > G > K > O$ $D > H > L > P$

Additionally, the block is geometrically correlated if the same tests are true after the block has been rotated through 90, 180, or 270 degrees (step 68). Again, the number of geometrically correlated blocks is summed throughout the whole image, and the final result is considered as a percentage of the non-DC blocks. The high percentage would mean that the image should not be compressed as the compressed version would suffer visible degradation in quality.

Size

A final error metric that is used is the size of the image. In essence, a decision is made so that any image smaller than a certain size is not compressed. Small images are not worth compressing partly because they do not greatly affect the performance of the hardware, mostly because the smaller the image that is supplied by the application, the more critical individual detail in the image tends to be. Thus, if there is an image that is 4 pixels by 4 pixels, then each individual pixel is probably pretty important. Whereas for an image that is 2000 pixels by 2000 pixels, the individual pixels probably do not matter very much. In one embodiment of the present invention, the size cut off is 64×64 pixels. An image above the size of 64×64 pixels will pass this analysis step. It should be understood that any size can be set for this analysis method or that the size can be used to scale the sensitivity to other error metric conditions.

Combination of Analysis Methods

Figure 6:
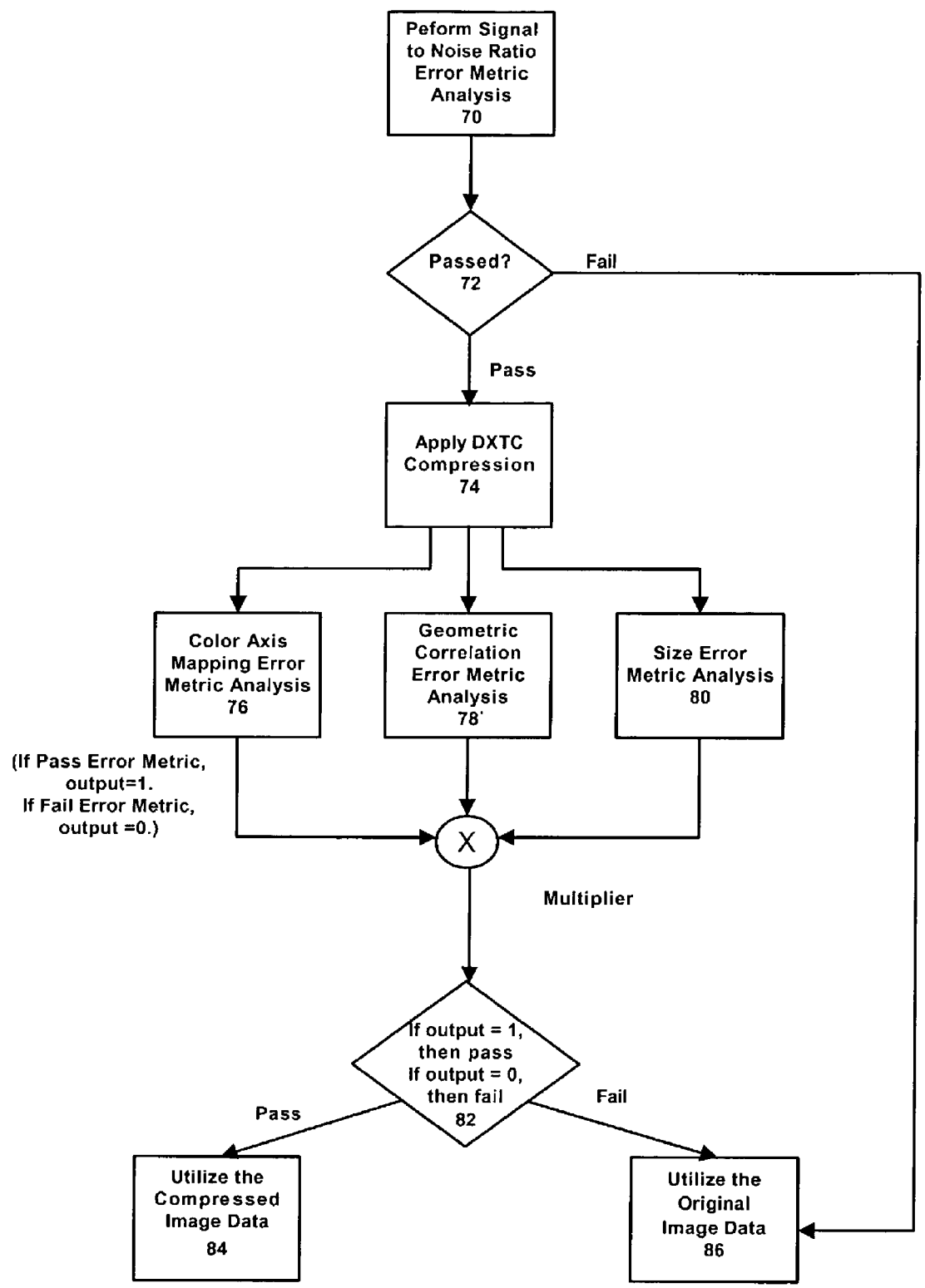
FIG. 6 presents a flow chart detailing an example embodiment of the present invention.

FIG. 6 presents a flow chart detailing an example embodiment of the present invention. In step 60, signal to noise ratio error metric analysis method is performed. Then in step 72 it is determined whether the analysis method passed or failed the image. If the image failed, then the original is used in step 86. If the image passed, then DXTC compression is applied in step 74. Next the analysis methods based on color axis mapping error metric, geometric correlation error metric and size error metric are performed (steps 76, 76 and 80). The results are multiplied (ANDed). A check of the final result is performed in step 82. If the final result is a pass, then the compressed image is used in step 84. If not, the original image data is used in step 86.

Those skilled in art can appreciate that the sequence presented in FIG. 6 is an example only. A number of error metrics can be applied in serial or parallel and the order can be re-arranged to achieve the desired results. For example, the size error metric analysis method may be performed first. Furthermore the settings and criteria that are in each error metric method can be find-tuned and set by the user such that the desired results can be achieved.

Performance

Most of the analysis methods described above are actually integral parts of the compression process. Therefore, the present invention incurs very little extra time cost to collect error metric data during compression. Also since compression itself is an operation that takes significant time, data collection is a shorter operation. Furthermore the processing cost is also low since the compression process gives the data needed to perform the error metric analysis.

Conclusion

Thus an analysis method to produce a series of measurements which determines whether an image is suitable for compression is described in conjunction with one or more specific embodiments. While this invention has been described in detail with reference to certain preferred embodiments, it should be appreciated that the present invention is not limited to those precise embodiments. Rather, in view of the present disclosure, which describes the current best mode for practicing the invention, many modifications and variations would present themselves to those of skill in the art without departing from the scope and spirit of this invention. The invention is defined by the claims and their full scope of equivalents.

The invention claimed is:

1. A method of determining image compression suitability, using an image compression device, comprising:
   performing, by the image compression device, a compression process on an uncompressed image to generate a compressed image of said uncompressed image whereby said uncompressed image and compressed image are divided into blocks;
   gathering data from said compression process on said uncompressed image by the image compression device;
   performing an error metric analysis with said data by the image compression device;
   checking each of said blocks in said uncompressed image and compressed image by the image compression device;
   in addition to performing error metric analysis on the compressed image, also performing error metric analysis on blocks of the uncompressed image; and
   in response, deciding, by the image compression device, based on a count of said blocks that fail the checks, which of said uncompressed image or said compressed image is a suitable representation of said uncompressed image for storage and/or transmission based on the error metric analyses on the compressed image and the uncompress image.

2. The method of claim 1 wherein performing an error metric analysis uses geometric correlation as said error metric.

3. The method of claim 2 wherein performing a geometric correlation error metric analysis further comprises:
   identifying all pixel values in each of said blocks;
   performing a first check of said pixel values to ensure that pixel values progress in decreasing monotone fashion from left to right in each row;
   performing a second check of said pixel values to ensure that pixel values process in decreasing monotone fashion from top to bottom in each column; and
   declaring a geometric correlation when said first and second checks are satisfied.

4. The method of claim 3 further comprising:
   rotating the compressed image by 90 degrees;
   performing said first and second checks;
   rotating the compressed image by 180 degrees;
   performing said first and second checks;
   rotating the compressed image by 270 degrees;
   performing said first and second checks; and
   declaring a geometric correlation when said all of said checks are satisfied.

5. The method of claim 1 wherein performing an error metric analysis uses axis mapping as said error metric.

6. The method of claim 5 wherein performing an axis mapping error metric analysis further comprises:
   calculating axis mapping error between a source point and a mapped point on the color axis in the three-dimensional color space;
   performing calculating for axis mapping errors for all source points in each of said blocks; and
   summing all of said axis mapping errors using a summed square error method to produce a summed square error; and
   determining if said summed square error is greater than a preset limit.

7. The method of claim 6 wherein summing uses a root mean square method.

8. The method of claim 1 wherein performing an error metric analysis on the uncompressed image uses signal-to-noise ratio as said error metric.

9. The method of claim 8 wherein performing a signal-to-noise ratio error metric analysis further comprises:
   decomposing said uncompressed image into three color components;
   transforming said blocks of said uncompressed image into frequency domain for each of said three color components using the DCT method;
   calculating values of low frequency blocks of said uncompressed image; and
   summing said values of low frequency blocks.

10. The method of claim 8 wherein performing a signal-to-noise ratio error metric analysis further comprises:
    checking whether said image is using the full range of color bit-depth.

11. The method of claim 1 wherein performing an error metric analysis uses image size as said error metric and wherein the method skips performing the compression process when image size is determined to be too small.

12. The method of claim 11 where said image size is too small if it is 64×64 pixels or smaller.

13. The method of claim 1 wherein all of said operations are performed in real-time.

14. A method of determining image compression suitability, using an image compression device, comprising:
    performing, by the image compression device, signal to noise ratio error metric analysis on an image;
    applying, by the image compression device, DXTC compression to said image to produce a compressed image if said image passes said signal to noise ratio error metric;
    performing, by the image compression device, color axis mapping error metric analysis on said image based on said DXTC compression;
    performing, by the image compression device, geometric correlation error metric analysis on said image based on said DXTC compression;
    performing, by the image compression device, size error metric analysis on said image; and
    using, by the image compression device, said compressed image if said image passes said color axis mapping error metric analysis and geometric correlation error metric analysis and size error metric analysis, otherwise use the original image.

15. A method of compressing an uncompressed image, using an image compression device, comprising:
    performing, by the image compression device, an error metric analysis on blocks of data of a compressed image and an error metric analysis on blocks of the uncompressed image; and
    deciding, by the image compression device, which of the uncompressed image or said compressed image is a suitable representation of said uncompressed image for storage and/or transmission based on both the error metric analysis on said blocks of the compressed image and the error metric analysis on said blocks of the uncompressed image.

16. The method of claim 15 wherein said error metric analyses comprise decomposing said uncompressed image into blocks and performing at least one of: geometric correlation; axis mapping; signal to noise ratio and low frequency error metric analysis using said blocks.

17. A method for determining image compression suitability, using an image compression device, comprising:
   performing, by the image compression device, a compression process on an image to generate a compressed image of said image whereby said image is divided into blocks;
   gathering data from said compression process of said image;
   performing an error metric analysis with said data;
   checking each of said blocks in said image;
   deciding, by the image compression device, whether to accept said compressed image as a suitable representation of said image for storage and/or transmission;
   wherein performing an error metric analysis uses geometric correlation as said error metric; and
   wherein performing a geometric correlation error metric analysis further comprises:
      identifying all pixel values in each of said blocks;
      performing a first check of said pixel values to ensure that pixel values progress in decreasing monotone fashion from left to right in each row;
      performing a second check of said pixel values to ensure that pixel values process in decreasing monotone fashion from top to bottom in each column; and
      declaring a geometric correlation when said first and second checks are satisfied.

18. A method for determining image compression suitability, using an image compression device, comprising:
   performing, by the image compression device, a compression process on an image to generate a compressed image of said image whereby said image is divided into blocks;
   gathering data from said compression process on said image;
   performing, by the image compression device, an error metric analysis with said data;
   checking each of said blocks in said image;
   deciding whether to accept said compressed image as a suitable representation of said image for storage and/or transmission;
   wherein performing an error metric analysis uses geometric correlation as said error metric;
   wherein performing a geometric correlation error metric analysis further comprises:
      identifying all pixel values in each of said blocks;
      performing a first check of said pixel values to ensure that pixel values progress in decreasing monotone fashion from left to right in each row;
      performing a second check of said pixel values to ensure that pixel values process in decreasing monotone fashion from top to bottom in each column;
      declaring a geometric correlation when said first and second checks are satisfied;
      rotating the image by 90 degrees;
      performing said first and second checks;
      rotating the image by 180 degrees;
      performing said first and second checks;
      rotating the image by 270 degrees;
      performing said first and second checks; and
      declaring a geometric correlation when said all of said checks are satisfied.

19. A method for determining image compression suitability, using an image compression device, comprising:
   performing, by the image compression device, a compression process on an uncompressed image to generate a compressed image of said uncompressed image whereby said compressed image is divided into blocks;
   gathering data from said compression process of said uncompressed image;
   performing an error metric analysis with said data;
   checking each of said blocks in said compressed image;
   dividing the uncompressed image into blocks;
   gathering data from said uncompressed image;
   performing an error metric analysis with said data;
   checking each of said blocks in said uncompressed image;
   wherein performing an error metric analysis uses signal-to-noise ratio as said error metric; and
   wherein performing a signal-to-noise ratio error metric analysis further comprises:
      checking whether said uncompressed image is using the full range of color bit-depth; and
      deciding whether to accept said compressed image or uncompressed image as a suitable representation of said uncompressed image based on the error metric analysis.

* * * * *